United States Patent
Brotz et al.

(10) Patent No.: US 6,439,518 B2
(45) Date of Patent: *Aug. 27, 2002

(54) APPARATUS FOR CAMERA MOUNT ON TRIPOD PLATFORM

(75) Inventors: Ralph Theodore Brotz, deceased, late of Kohler; by Michael R. Brotz, legal representative, Kohler; by Ralph R. Brotz, legal representative, Kohler; by John G. Brotz, legal representative, Kohler; by Roman G. Brotz, legal representative, Sheboygan, all of WI (US)

(73) Assignee: Plastics Engineering Co., Sheboygan, WI (US)

( * ) Notice: Subject to any disclaimer, the term of this patent is extended or adjusted under 35 U.S.C. 154(b) by 12 days.

This patent is subject to a terminal disclaimer.

(21) Appl. No.: 09/747,267

(22) Filed: Dec. 26, 2000

Related U.S. Application Data

(63) Continuation-in-part of application No. 09/444,434, filed on Nov. 22, 1999, now Pat. No. 6,209,830.

(51) Int. Cl.[7] .............................................. A47B 91/00
(52) U.S. Cl. ................. 248/187.1; 248/181.2; 248/176.2
(58) Field of Search ........................ 248/187.1, 181.2, 248/182.1, 186.2, 181.1, 161, 183.1, 163.1, 177.1

(56) References Cited

U.S. PATENT DOCUMENTS

| | | | |
|---|---|---|---|
| 365,436 A | 6/1887 | Freeman | |
| 855,149 A | 5/1907 | Vaughn et al. | |
| 916,286 A | 3/1909 | Evans | |
| 1,280,013 A | 9/1918 | Goddard | |
| 2,650,788 A | 9/1953 | Hulstein | 248/229 |
| 2,670,228 A | 2/1954 | Pagliuso | 287/87 |
| 2,703,691 A | 3/1955 | Minnis | 248/161 |
| 4,415,136 A * | 11/1983 | Knoll | 248/181 |
| 4,781,347 A * | 11/1988 | Dickie | 248/183 |
| 5,072,907 A | 12/1991 | Vogt | 248/181 |
| 5,664,750 A | 9/1997 | Cohen | 248/231.71 |
| 5,790,910 A | 8/1998 | Haskin | 396/427 |
| 6,209,830 B1 * | 4/2001 | Brotz | 248/187.1 |

* cited by examiner

*Primary Examiner*—Leslie A. Braun
*Assistant Examiner*—A. Joseph Wujciak
(74) *Attorney, Agent, or Firm*—Robert T. Johnson

(57) ABSTRACT

This present invention discloses apparatus and a method for mounting a camera on a tripod platform for taking pictures and this mounting apparatus includes a cradle cup mounted on a tripod platform and an O ring mounted in a groove on the inside diameter of the cradle cup, and a pear shaped or oblate spheroid shaped ball attached to the bottom of a camera and the ball attached to the camera is set into the cradle cup and the ball sets on O ring in the groove on the inside diameter of the cradle cup. The inside diameter of the O ring is less than the diameter of the pear shaped ball attached to the camera.

5 Claims, 5 Drawing Sheets

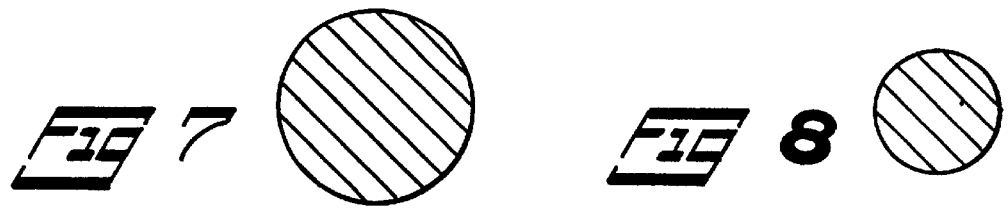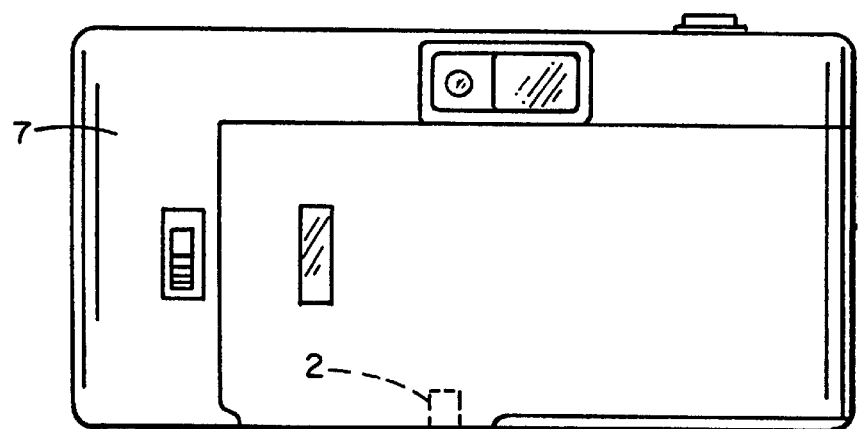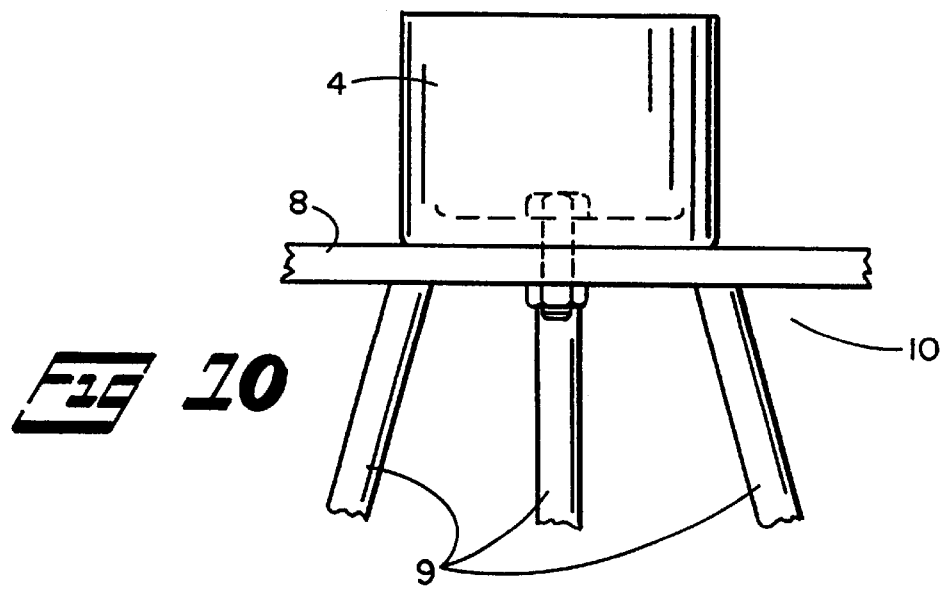

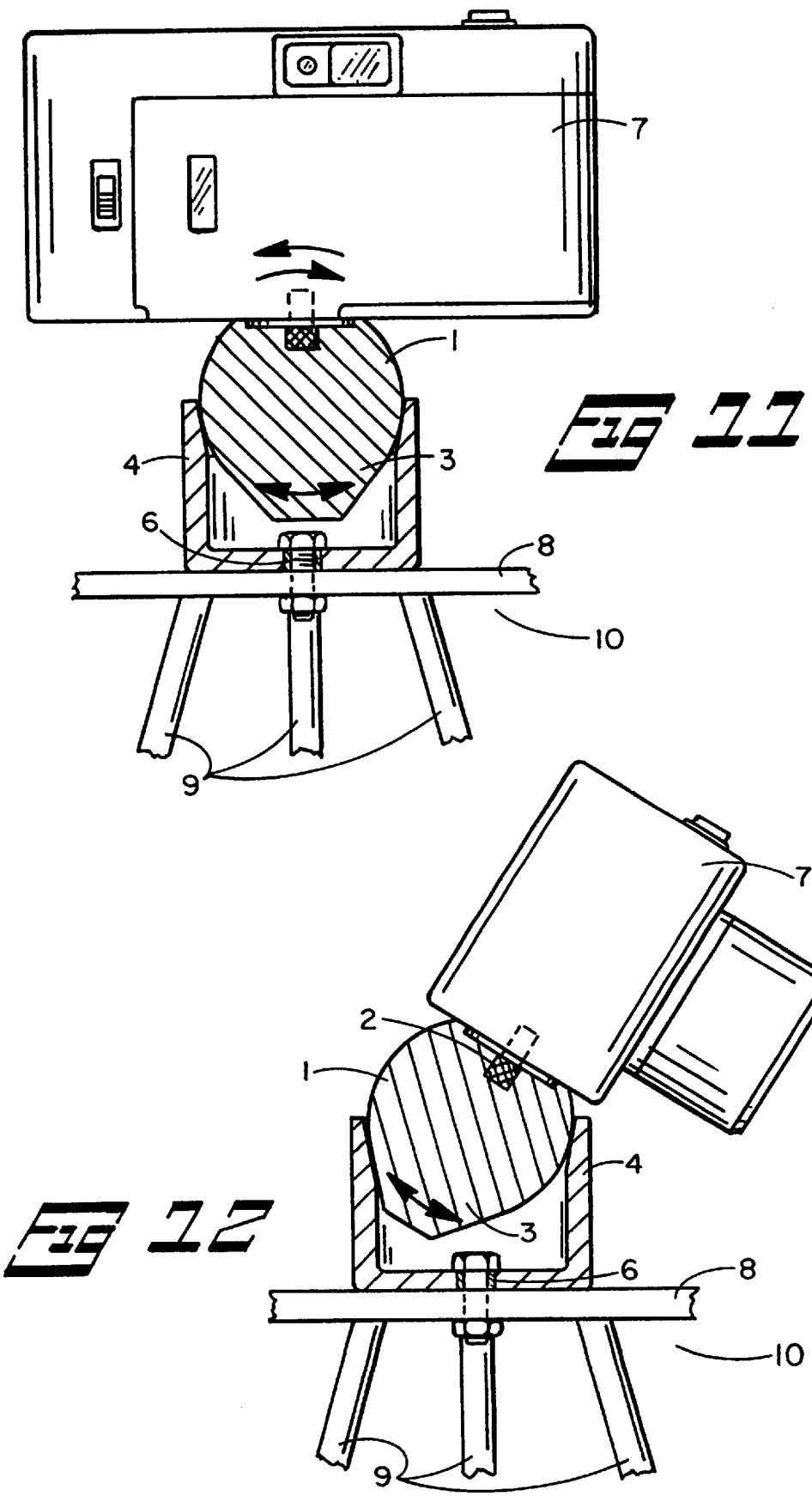

See Fig 19

APPARATUS FOR CAMERA MOUNT ON TRIPOD PLATFORM

This is a C-I-P patent application by same inventor of prior application Ser. No. 09/444,434, filed Nov. 22, 1999 entitled APPARATUS FOR CAMERA MOUNT ON TRIPOD PLATFORM, now U.S. Pat. No. 6,209,830 B1 issued Apr. 3, 2001 and assigned to; Plastics Engineering Co. 3518 Lakeshore Rd, Sheboygan, Wis. 53083, (recordation date Dec. 14, 1999 Reel/frame 010460/0631) by inventor RALPH T. BROTZ, now deceased, formerly of 415 Ridge ct., Kohler, Wis. 53044.

This C-I-P application made by the trustees for the estate of the inventor RALPH T. BROTZ, are;

MICHAEL R. BROTZ JOHN G. BROTZ
315 RIDGEWAY ST. 937 ASPEN RD.
KOHLER, WIS. 53044
RALPH R. BROTZ
902 MULBERRY LN.
KOHLER, WIS. 53044
JOHN G. BROTZ
937 ASPEN RD.
KOHLER, WIS. 53044
ROMAN G. BROTZ
1302 RIDGEWOOD LN.
SHEBOYGAN, WIS. 53081

BRIEF SUMMARY OF THE INVENTION

As stated in the parent application, taking pictures requires a steady, non-moving camera, and to accomplish this, mounting the camera on a tripod platform is preferred, and this present invention is to disclose and claim apparatus for mounting a camera on a tripod platform by attaching a pear shaped ball on the camera base, and placing the ball assembly attached to the camera, in a cradle cup having an O ring mounted in a groove on the inside diameter of the cradle cup, and the cradle cup attached to the Picture taking by a camera requires a steady, non-moving camera for clear well defined pictures, and in view of this, cameras are mounted on tripod platforms or tables, with camera angle adjustments attained by turning of gears, or unscrewing fasteners, to obtain the proper camera aiming angle. To disassemble the camera from this conventional mounting requires manipulation to unscrew the camera from the tripod table or platform.

This present invention discloses apparatus and method for mounting a camera on a tripod platform by attaching to the camera a modified ball having a pear or partial oblate spheroid shape,and the assembly of the camera and modified ball with a conical segment part of the ball of pear shape set into a cradle cup attached to a tripod platform, and an O ring mounted in a groove in the inner circumference of the cradle cup, to allow movement of the camera to aim at the desired picture subject.

An object of this invention is to disclose apparatus for ball and cradle cup camera mount on a tripod platform by mounting a ball having a pear or partial oblate spheroid shape, onto the bottom of a camera, and the ball having a bottom cone segment, opposite the camera mount and attaching a cradle cup of cylindrical shape, and having a diameter greater than the ball diameter to the tripod platform and the assembly of the ball mounted on the camera set on the inside circumference of an O ring, mounted in a groove on the inside circumference of the cradle cup and the cone segment of the ball extending into the cradle cup lower section to allow rotation and tilting of the camera and camera mount ball assembly mounted on the O ring in the cradle cup.

PRIOR ART DISCLOSURE

Following is a listing of prior art U.S. patents.

U.S. Pat. No. 365,435 for PHOTO APPARATUS; Disclosure is made of a ball and socket mount for a camera.

U.S. Pat. No. 855,149 for ATTACHMENT FOR TRIPOD CAMERA: Disclosure is made of adjustable ball and socket mount for a camera mount on a tripod.

U.S. Pat. No. 916,286 for CAMERA TRIPOD; Disclosure is made of an adjustable ball and socket mount.

U.S. Pat. No. 1,280,013 for CAMERA MOUNTING; This patent discloses adjustable socket for a ball and socket mount.

U.S. Pat. No. 2,650,788 for ADJUSTABLY SUPPORTING CAMERAS; There is disclosed adjustable ball and socket mount.

U.S. Pat. No. 2,670,228 for BALL SWIVEL, TRIPOD HEAD; Ball and socket mount to allow swivel and tilt.

U.S. Pat. No. 2,703,691 for CAMERA SUPPORT; Disclosure is made of a ball and socket mount on telescoping leg.

U.S. Pat. No. 5,072,907 for TRIPOD HEAD; Disclosure is made of a ball and socket with a camera plate on the ball.

U.S. Pat. No. 5,664,750 for CAMERA MOUNT; Disclosure is made of a double ball and socket on a mast.

U.S. Pat. No. 5,790,910 for CAMERA MOUNTING APPARATUS; This patent discloses a ball and socket mount for a surveillance camera.

None of the above prior art patents disclose either singly or collectively the invention of this present disclosure.

BRIEF DESCRIPTION OF DRAWINGS

FIG. 7—Plan view of bottom cone mount.

FIG. 8—Plan view of bottom cone.

FIG. 9—Camera and mount ball attached thereto.

FIG. 10—Cradle cup mounted on tripod platform.

FIG. 11—Camera and mount ball sitting in cradle. cup mounted on tripod platform.

FIG. 12—Camera and mount ball sitting in tilt position in cradle cup mounted on tripod platform.

DRAWING LEGENDS

Figure 1:
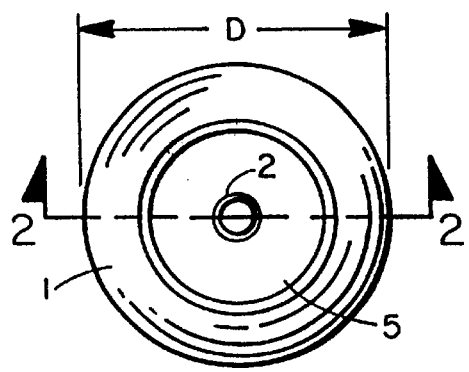
FIG. 1—Plan view of camera mounting ball.

1—Camera mount ball.
2—Threaded insert.
3—Bottom cone; conical section of camera mount ball.
4—Cradle cup.
5—Flat top of ball.
6—Threaded female insert.
7—Camera.
8—Tripod platform.
9—Tripod legs.
D—Ball diameter.
D'—Diameter of cradle cup segment less than D.
D"—Diameter greater than D, open entry of cradle. cup.
10—Tripod.
11—Upper section of cradle cup.
12—Lower section of cradle cup.
13—O ring.
14—Groove for O ring. D'"—Inside diameter of O ring.

DETAILED DESCRIPTION

This invention is to disclose apparatus for providing stability to a camera for taking pictures for prevention of blurs, or fuzzy pictures.

The apparatus includes as shown in FIGS. 1,2,5,6,9,11, and 12 and further improvement is shown in FIGS. 13,14, 15,16 17,18 and 19 showing an O ring 13 mounted in cradle cup groove 14 and the camera mount ball 1 having a pear or oblate spheroid shape with a flat top 5 on the camera mount ball 1 and centered in the flat top 5, of this camera mount ball 1 is a threaded insert 2 and a base segment bottom cone 3, shown in FIGS. 7 and 8, as plan views of this bottom cone segment.

Reference is now made to FIG. 9, to show the camera mount ball 1, and threaded insert 2 on camera mount ball 1 threaded into the camera 7 female threaded opening, which female threaded opening is standard in all cameras for mounting directly on a tripod platform.

Figure 13:
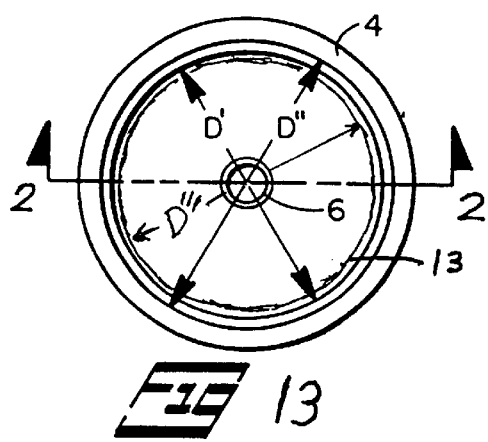
FIG. 13—Plan view of cradle cup with O ring mounted therein.
Figure 14:
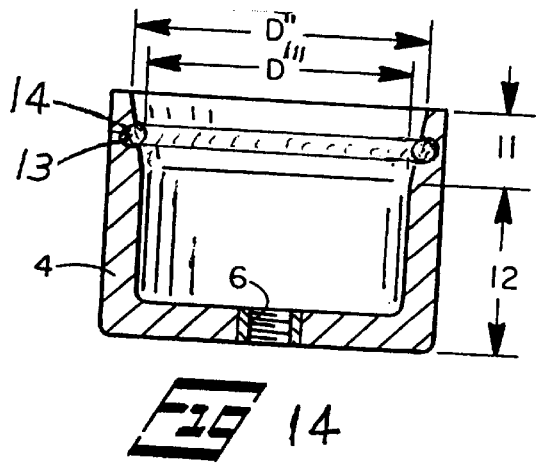
FIG. 14—Elevation view of cross section of cradle cup having a flared top opening with O ring mounted therein.
Figure 15:
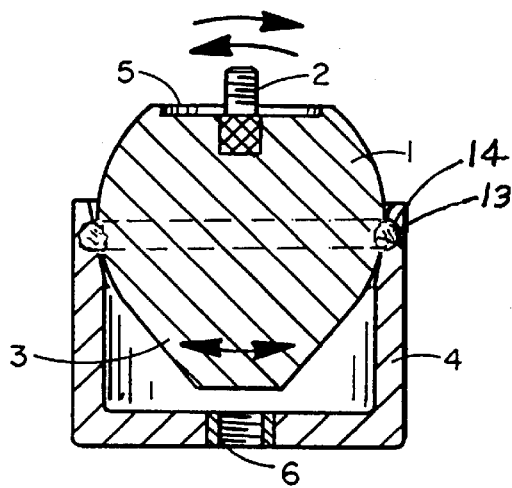
FIG. 15—Cross section elevation of camera mount ball resting on O ring mounted in cradle cup having a flared top opening.
Figure 16:
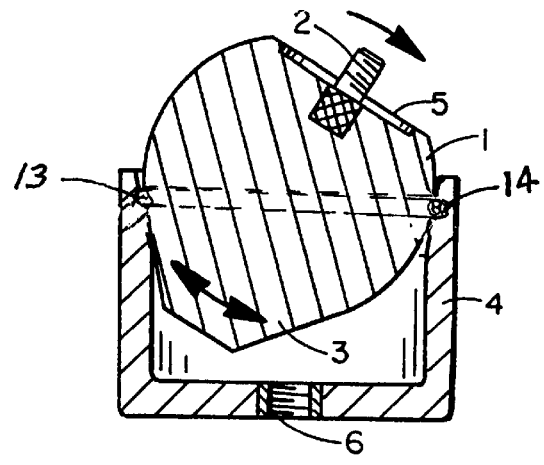
FIG. 16—Cross section elevation view of camera mount ball in tilted position resting on O ring mounted in cradle cup having a flared top opening.

The assembly of the camera 7, with the camera mount ball 1 attached to the camera 7, as shown in FIG. 9 is placed in cradle cup 4, of cylindrical shape (see FIGS. 5, 6, 11, 12, 15, 16, 17 with the camera mount ball 1 extending into the cradle cup 4. The cradle cup 4 of cylindrical shape is shown in FIGS. 3, 4, 5, 6, 10 11, 12. FIGS. 13, 14, and 18 show O ring 13 mounted in groove 14 in cradle cup 4. FIGS. 14 and 18 cross section elevation view.

Figure 3:
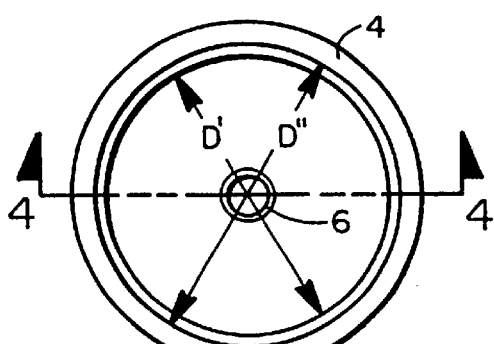
FIG. 3—Plan view of ball cradle cup.
Figure 4:
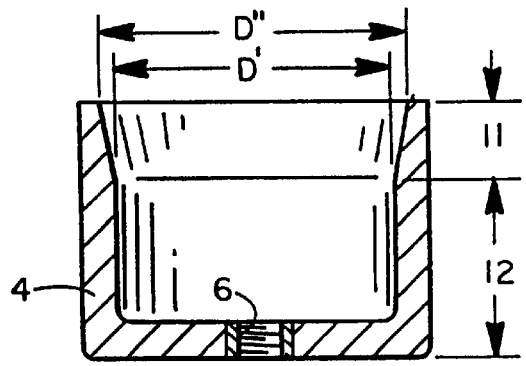
FIG. 4—Elevational cross section view of ball cradle cup.

The plan view of the cradle cup 4 as shown in FIG. 3, and FIG. 13 showing O ring mounted in cradle cup 4 FIG. 4 is elevational cross section view. In the center of the bottom of the cradle cup 4, is a threaded female insert 6, for attachment by a threaded screw, of the cradle cup 4 to the platform 8, of tripod 10.

Figure 2:
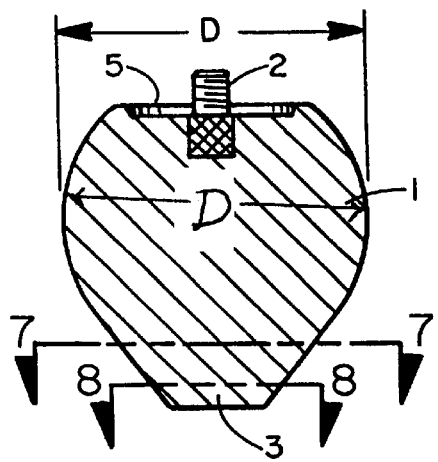
FIG. 2—Cross section elevational view of camera mounting ball.

Referring now to FIGS. 3 and 4 the inside diameters of the cradle cup 4 sections, based on the diameter D of the camera mount ball 1. see FIG. 2. D' is diameter of cradle cup 4, lower section 12 less than D, and sets the limit of entry of camera mount ball 1 into the cradle cup 4. D" diameter of upper section 11 of cradle cup 4 is greater than diameter D of camera mount ball 1.

Reference is made to FIG. 18 showing cradle cup 4, and O ring 13 mounted in groove 14 of cradle cup 4, and D' is diameter of cradle cup inside diameter and D'" is the inside diameter of O ring 13 mounted in groove 14 of the cradle cup 4.

Figure 6:
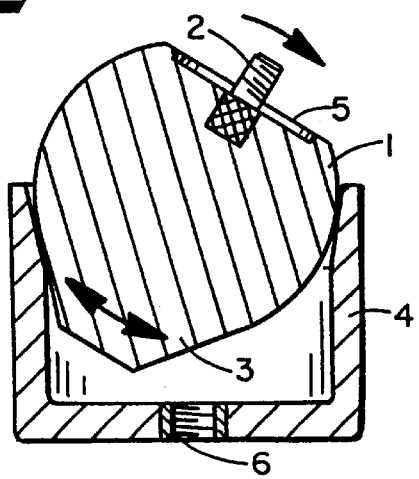
FIG. 6—Elevational view of ball tilted setting in cradle cup.
Figure 5:
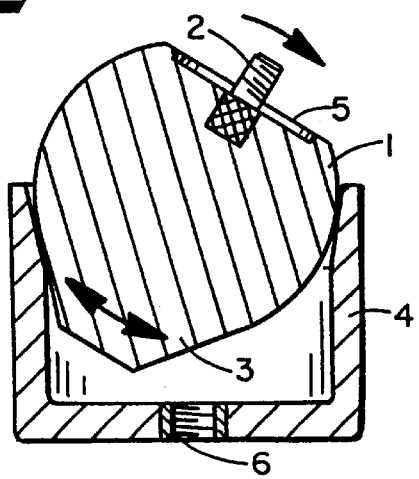
FIG. 5—Ball set in cradle cup; elevational view.
Figure 17:
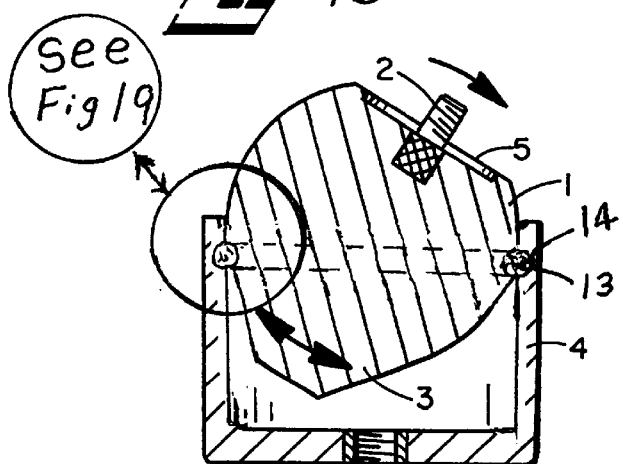
FIG. 17—Cross section elevation view of camera mount in tilted position resting on O ring mounted in cradle cup having a non-flared or straight wall top opening.
Figure 18:
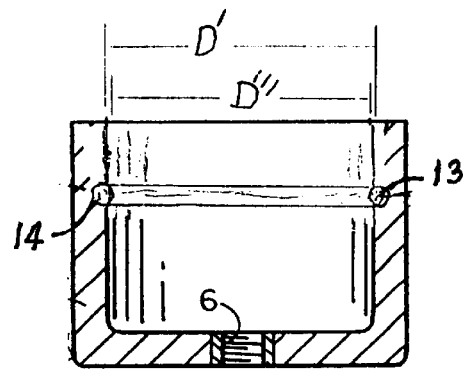
FIG. 18—Elevation cross section view of cradle cup having a non-flared or straight wall top opening.
Figure 19:
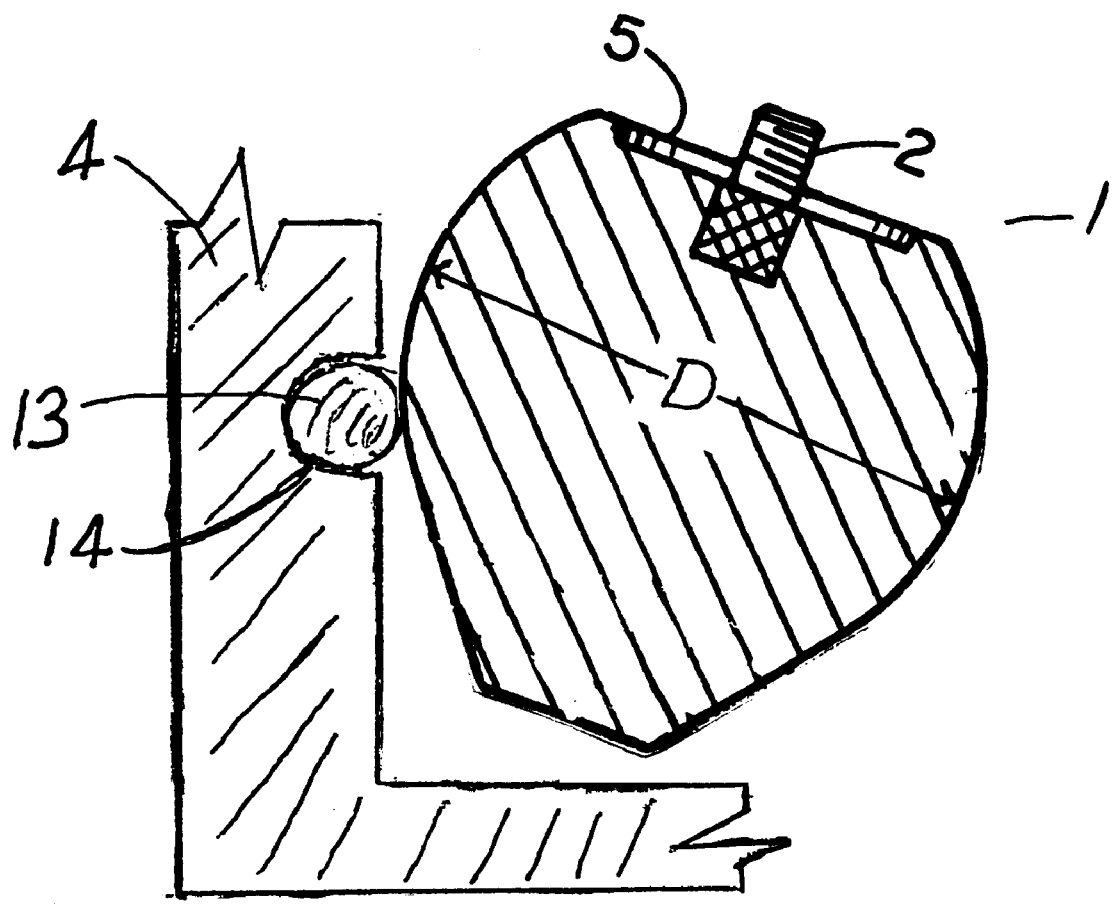
FIG. 19—Enlarged segment of FIG. 17, showing detail of camera mount ball contact on inside diameter of O ring mounted in cradle cup groove.

FIGS. 4, 5, and 6 show flared out top opening of the cradle cup 4, but on mounting an O ring 13 in the groove 14 of the cradle cup 4 as shown in FIG. 17 obviates the need for the flared out opening of the cradle cup 4.

Referring now to the tripod 10, FIGS. 10, 11 and 12 show the tripod 10, tripod platform 8, and tripod legs 9, and further FIGS. 9 and 10 are shown with the camera 7 and camera mount ball 1 attached thereto aligned with the cradle cup 4, mounted on tripod platform 8 of tripod 10 and FIG. 11 shows the completed assembly of the camera 7 and camera mount ball 1 sitting in cradle cup 4.

As shown in FIG. 12, the camera 7, in tilt position, with camera mount ball 1 attached and the camera mount ball sitting in cradle cup 4, allows for free rotational movement of the camera 7 and camera mount ball 1 assembly and further the camera-ball assembly can be tilted to aim the camera either up or down. The tilt is limited by bottom cone 3 segment of the camera mount ball 1 hitting the inner wall of the cradle cup 4 as shown in FIG. 12, and further this insures the camera 7 camera ball mount 1 assembly against falling out of the cradle cup 4 when in any tilt position.

The above described apparatus simplifies the rapid removal of the camera from the cradle cup 4 by simply lifting the camera 7 camera mount ball 1 assembly from the cradle, cup 4 without unscrewing any mounting screws or control levers.

Further this invention discloses apparatus of a camera mount ball 1, attached to camera 7 by a threaded screw 2 extending into female thread in the camera bottom and a cradle cup 4 rigidly mounted on a tripod platform 8 and the camera mount ball 1 with a bottom cone section 3 opposite the camera mount on the ball and the camera 7 with camera mount ball 1 attached placed in the cradle cup 4 and the ball extending into the cradle cup 4 having a top diameter D" section at the top section 11 of the cradle cup 4 greater than the ball diameter D and the bottom cone section 3 of the ball extending into the cradle cup 4 lower section 12 having a smaller diameter D' than the ball diameter D to allow rotation and tilting of the camera and camera mount ball assembly. To better describe the cradle cup 4 of this invention the cradle cup 4 mounted on a tripod platform 8 and the cradle cup 4 has a top section 11 diameter D" larger than the camera mount ball 1 diameter D, to allow entry of the camera mount ball 1 into the cradle cup 4 and the cradle cup 4 has a bottom section 12 diameter D' smaller than the camera mount ball 1 diameter D and the bottom cone section 3 of the camera mount ball 1 extends into the cradle cup 4 lower section 12 having a diameter D' less then the camera mount ball 1 diameter D.

On using the above described camera mount, the static friction between the ball shape and the cradle cup should be sufficient to hold the camera 7 in any set position, yet having low sliding friction to be easily moved to any other desired position.

The components of the camera mount ball 1 and cradle cup 4 may be formed of thermoplastic such as nylon, polyester, polyethylene, or polypropylene, or thermoset plastic material such as phenolic, melamine, melamine/phenolic polyester, polyurethane or urea.

To improve the nesting of the camera mount ball 1, in the cradle cup 4, an O ring 13 is fitted in a groove 14 on the inside of cradle cup 4, and the inside diameter D''' of the O ring 13 is less than the diameter D of the camera mount ball 1. The O ring 13 for example may be of an elastomer of rubber, nitrile rubber, silicon rubber, or a fluorocarbon elastomer. The "hardness" of the O ring may be in the range of Shore hardness of about 50 to about 60, and an elongation of from about 250% to about 325%. The required hardness of the O ring 13 may vary depending on the weight of the camera assembly placed in the cradle cup 4.

On mounting an O ring 13 in cradle cup 14 the diameter D' of the cradle cup 4 is greater than diameter D of camera mount ball 1, so that camera mount ball 1 rests on O ring 13 having an inside diameter D''' which is less than the diameter D of camera mount ball 1, thus the assembly of the camera 7 and ball 1 attached thereto rests on the O ring 14.

Having described my invention I claim:

1. Apparatus for camera mount on tripod platform wherein the improvement comprises:
   a. an assembly of a camera and a ball having a pear or oblate spheroid shape attached to said camera;
   b. said pear shaped ball having a conical section;
   c. a cradle cup fastened to a tripod platform;
   d. a groove inside of and concentric to circumference of said cradle cup
   e. an O ring mounted in said groove of said cradle cup, said cup having an inside diameter greater than outside diameter of said ball of said assembly of a camera and a ball,
   f. inside diameter of said O ring less than the diameter of said ball of said assembly of camera and a ball
   g. said assembly of a camera pear shaped or oblate spheroid shaped ball setting in said cradle cup and said ball resting on said O ring mounted in said groove in said cradle cup.

2. Apparatus for camera mount on tripod platform of claim 1 further comprising:
   a. said cradle cup of cylindrical shape;
   b. said cradle cup having a diameter greater than diameter of said ball of said assembly of said camera and ball,
   c. said O ring mounted in said groove in said cradle cup and,
   d. inside diameter of said O ring less than diameter of said ball attached to said camera.

3. Apparatus for camera mount on tripod platform of claim 2, further comprising:
   a. said ball of said assembly of camera and ball and said cradle cup formed of thermoset plastic compound selected from the group consisting of phenolic, melamine, melamine/phenolic, polyester, polyurethane and urea,
   b. open end of said cradle cup flared outward, and said groove in said cradle cup located below said open end flared outward.

4. Apparatus for camera mount on tripod platform of claim 2, further compromising:
   said ball of said assembly of camera and ball and said cradle cup formed of plastic material selected from the group consisting of nylon, polyester, polyethylene and polyproylene, or thermoset material consisting of phenolic, melamine, melamine-phenolic, polyester, polyurethane and urea.

5. Apparatus for camera mount on tripod platform of claim 1, further comprising:
   a. said ball of said assembly of camera and ball and said cradle cup formed of plastic material selected from the group consisting of thermoplastic and thermoset compounds and,
   b. said O ring formed of elastomer selected from the group consisting of rubber, nitrile rubber, silicon rubber or fluorocarbon.

* * * * *